April 5, 1927.  1,623,673

F. E. GROSE

JIG SAW MACHINE

Filed Feb. 26, 1924   2 Sheets-Sheet 1

Inventor:
Frank Edwin Grose
By
Attorney.

April 5, 1927.
F. E. GROSE
1,623,673
JIG SAW MACHINE
Filed Feb. 26, 1924    2 Sheets-Sheet 2
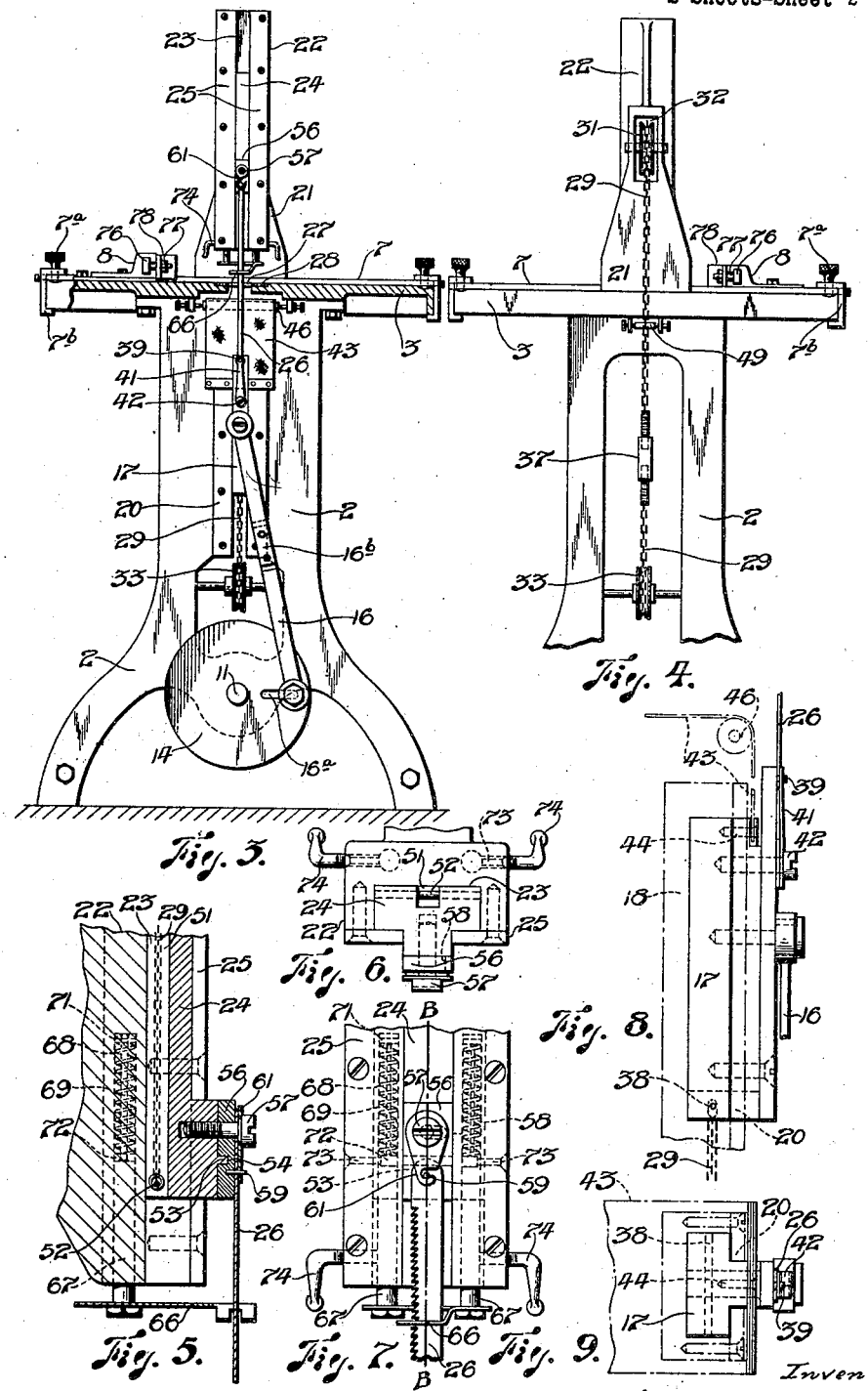
Inventor:
Frank Edwin Grose Patented Apr. 5, 1927.

1,623,673

UNITED STATES PATENT OFFICE.

FRANK EDWIN GROSE, OF COBURG, VICTORIA, AUSTRALIA.

JIG-SAW MACHINE.

Application filed February 26, 1924, Serial No. 695,316, and in Australia February 26, 1923.

This invention relates to power driven jig saws and more particularly to machines of the class employing a vertically reciprocating saw adapted for cutting metal and like materials other than wood. The object of the invention is to provide an improved jig saw machine which is of simple, compact, but strong and durable construction and which is capable of cutting materials of extreme hardness and toughness expeditiously and with greater accuracy and general efficiency than is obtainable with existing machines for the purpose.

The improved machine is simple and convenient in operation and manipulation and embodies several novel features which increase the general working efficiency and extend the utility of the machine.

A characteristic feature of the invention resides in the fact that upper and lower sliding blocks to which the respective ends of the saw blade are attached are interconnected by a chain or flexible band which passes around guide pulleys and in which a spring element and an adjusting device are interposed. This arrangement ensures that the saw blade is always maintained taut and in proper tension so that a vigorous and perfectly straight and accurate cutting stroke is obtained and any tendency to buckle the blade on the upward or return stroke is entirely obviated.

A further feature of the invention resides in the simple and effective means provided whereby the position of the saw may be adjusted to advance the top of its cutting edge any desired amount in relation to the bottom thereof, thereby governing the depth of cut per stroke of the saw.

A still further feature consists in providing a dust protector or apron which is adapted to reciprocate with the lower sliding block so as to prevent the dust produced by the saw blade during its cutting stroke, from entering the vertical slideway in which such lower block moves.

The above mentioned and other features will, however, be more readily apparent from the following description and appended claims.

Referring to the drawings which form part of this specification:—

Figure 3 is a front view of the machine looking in the direction of the arrow A in Figure 1.

Figure 4 is a rear view of the machine, the lower part of the supporting framework being omitted.

Figure 5 is a fragmentary vertical section taken on the line B—B in Figure 7, and showing on an enlarged scale the lower portion of the upper sliding block assembly with the saw blade adjustably connected thereto.

Figure 6 is a plan view looking on the top of the upper vertical slideway and showing the upper sliding block and associated parts seen in Figure 5.

Figure 7 is a front view of the parts seen in Figures 5 and 6.

Figure 8 is a side elevation on an enlarged scale of the lower sliding block assembly, the lower vertical slideway being indicated in broken lines.

Figure 9 is a plan of Figure 8.

Figure 1:
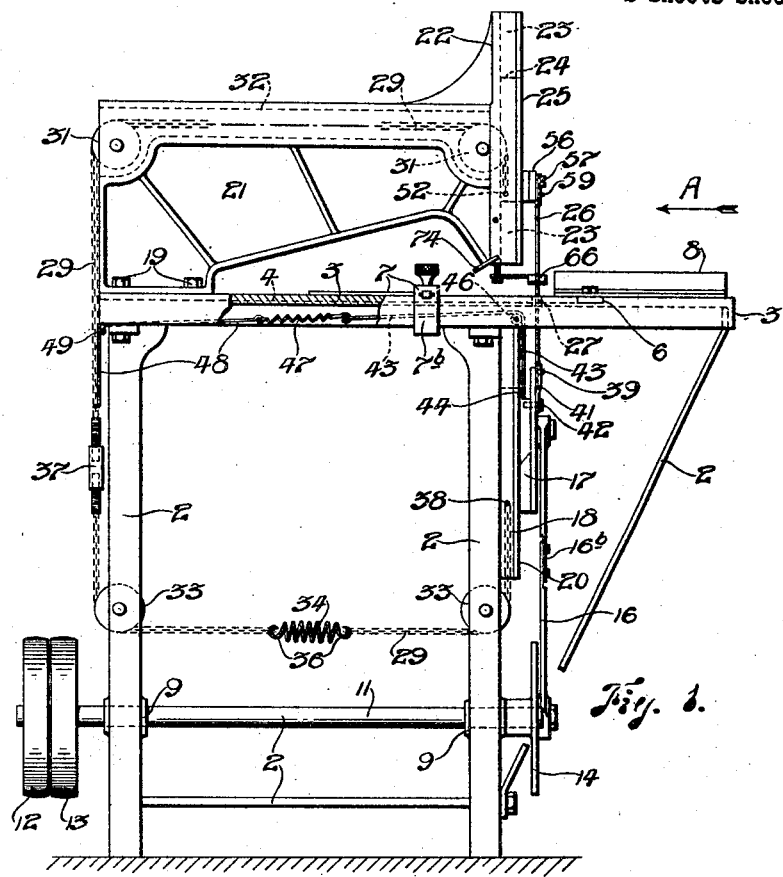
Figure 1 is a side elevation of a power driven jig saw machine in accordance with the present invention.
Figure 2:
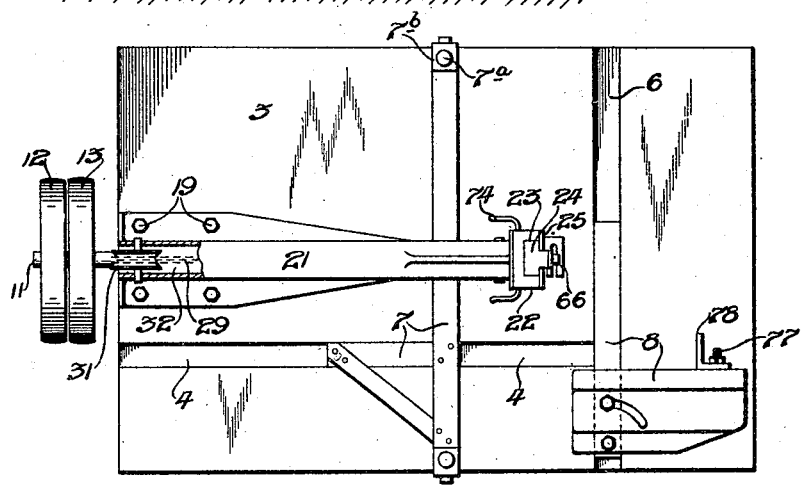
Figure 2 is a plan of Figure 1.

A jig saw machine in accordance with the present invention includes a framework designated in general by the numeral 2 and which is capable of supporting a horizontal work table or bench 3 and other stationary and moving parts of the machine. The table is provided in its upper face with horizontal slots or grooves 4 and 6 in which guides or gauges 7 and 8 are adapted to slide, the gauge 7 being employed when it is desired to cut material into strips and the gauge 8 for cross cutting operations as hereinafter described.

Bearings 9 carried by the framework 2 preferably adjacent its base afford support to a shaft 11 on which fast and loose pulleys 12 and 13 are mounted. This shaft 11 is provided with suitable operative connections, such for instance as a crank or eccentric 14 and connecting rod 16, with a lower sliding block 17 accommodated by a lower vertical slideway 18 disposed beneath the table 3.

This slideway 18 may be formed in the framework 2 as shown or, if desired, in a fixture attached thereto and is partially covered by face plates 20.

Secured to the table 3 as at 19 is an overhanging arm or bracket 21 which may consist of a casting and is provided with a vertical end portion 22 in which an upper vertical slideway 23 is formed. This upper slideway which is partially covered by face plates 25 is in vertical alignment with the aforesaid lower vertical slideway 18 and is adapted to accommodate an upper sliding block 24 between which and said lower sliding block a saw blade 26 extends and is secured as hereinafter described, an aperture or slot 27 being provided in the table or in a plate 28 of hardened material attached thereto to allow passageway for the saw blade.

To vary the stroke of the saw 26 the connecting rod 16 may be radially adjustable as at 16$^a$ on the crank 14, the length of the connecting rod being also adjustable as indicated at 16$^b$.

The said upper and lower sliding blocks are connected to each other by a flexible element, such for instance as a chain 29. This chain is suitably attached at one end to the lower end of the upper sliding block 24 and passes upwardly and horizontally therefrom around guide pulleys 31 and through a longitudinal passageway 32 in the overhanging arm 21, then downwardly and horizontally around guide pulleys 33 carried by the framework 2 and subsequently upwardly to the lower sliding block 17 to which the other end of the chain or band is attached.

A spring 34 is interposed at a convenient position in the flexible band 29 and connected thereto as at 36. The said spring is in tension and creates a force which, communicated by the chain 29, tends to pull the upper and lower sliding blocks in opposite directions. The saw blade 26 is thus held taut but resiliently and is prevented from buckling so that a clean regular cut may be obtained and the toughest of materials expeditiously worked upon without fear of the saw blade breaking. The tension of the spring 34 may be varied according to requirements by a turnbuckle or like adjusting device 37 also interposed in the chain 29 as shown.

The lower sliding block 17 before referred to is preferably of approximately T shape in cross section, as clearly shown in Figure 9 to conform to the shape of its slideway 18, and may be provided adjacent its lower end with a pin 38 to which the adjacent end of the chain or band 29 is attached as in Figure 8. Outstanding from the lower sliding block is a pin or projection 39 which is embraced by the lower end of the saw blade 26, an inwardly pressing spring clip 41, attached to the block 18 as at 42, being provided as a precautionary measure to prevent the saw blade disengaging the pin 39.

In order to prevent the dust produced during cutting operations of the saw blade from entering the lower vertical slideway 18, wherein it would be likely to interfere with the efficient working of the machine, a dust guard or apron 43 of leather, fabric or other suitable material is provided and may be attached as at 44 to some convenient part of the lower sliding block 17 so as to reciprocate therewith, the apron being of such width and length as to cover the top of the slideway 18 at all positions of the sliding block 17.

This apron passes upwardly and rearwardly around a guide roller 46 supported from the under surface of the table 3 or other convenient part, the free end of the apron being connected by a spring 47 with one end of a flexible line such as a belt or chain 48 which also passes over a roller 49 and is attached at its other end to the aforesaid chain or band 29.

The upper sliding block 24 is also preferably of approximately T shape in cross section as shown in Figure 6 and is provided with a longitudinal recess 51 to pass the band 29 which may be attached to a pin 52 extending transversely of said longitudinal recess and near the bottom thereof.

The lower end of the upper sliding block preferably stands out from the face plates 25 and may be provided with a transverse projection or rib 53 which is adapted to register with a groove 54 in an adjustable plate 56, by means of which said plate may be moved sidewardly in relation to the sliding block 24 and secured thereto in various arbitrary positions by a set screw 57 or the like. The hole 58 in said plate through which the screw 57 passes is elongated to permit of this sideward adjusting movement.

Outstanding from the adjustable plate 56 is a pin or projection 59 which is embraced by the upper end of the saw blade 26, a spring clip 61 being freely disposed around the shank of the screw 57 and adapted to press the saw blade against said adjustable plate. By slackening the screw 57 the position of the plate 56 may be adjusted sidewardly to thereby advance the upper end of the saw blade and set the blade at the desired overhanging inclination according to the depth of cut required per stroke, after which the set screw 57 is retightened.

A presser plate device is provided to press lightly upon the work when placed in position on the table for cutting operations and thus prevent the material from rising with the saw blade during the upstroke thereof. Such device may include a spring plate 66 attached to the lower ends of vertical rods 67 which are accommodated by the overhanging end portion 22 of the arm or bracket 21 as seen in Figures 5, 6 and 7. Springs 68 surround reduced portions 69 of the rods 67 and bear against collars or projections 71 at the upper ends of the rods and against stationary sleeve members 72 held by the screws 73 to the arm or bracket 21. Normally the springs 68 tend to raise the rods 67 and the presser plate 66 upwardly away from the table but the plate may be vertically adjusted as desired by pressing the plate downwardly to the desired position by hand and then tightening the hand screws 74 so that they tightly engage the rods 67 and prevent rising of the rods and presser plate until the said hand screws are slackened. The work being fed to the saw is placed beneath the presser plate 66, the springy nature of which causes the work to be held down against the table. The vertical adjusting of the presser plate is effected to accommodate different thicknesses of work.

When it is desired to saw material into strips, the cross cut gauge 8 is removed from the table and the gauge 7 adjusted and retained in the desired position by set screws 7ª passing through clamping members 7ᵇ which fit onto the ends of the gauge 7 and grip the edges of the table as shown, so as to assist the operator in guiding and feeding the material along the face of the gauge towards the saw blade.

The cross cut gauge 8 may be employed in combination with the gauge 7 for cross cutting material of comparatively restricted width, in which instance an end edge of the material bears against the gauge 7 which is set at the desired distance from the saw blade, and the rear edge of the material is held against the cross cut gauge 8 which may then be moved along its transverse groove 6 towards the saw blade to feed the material thereto as desired.

The said cross cut gauge is preferably provided with a longitudinal T slot 76 (Figures 3 and 4) to slidably accommodate a clamping screw 77, by means of which a right angled stop or distance piece 78 may be detachably retained at various positions along the length of the gauge. Thus to trim an end edge of a strip of material or to remove a thin portion therefrom, the distance piece 78 is adjusted at an appropriate position and the opposite end edge of the material to be cut is held in contact therewith throughout the travel of the gauge 8 towards and past the saw blade 26 which removes the desired edge of the material.

This adjustable distance piece arrangement is considered a novel feature of the invention which will be hereinafter more clearly defined in the appended claims.

Having now described my invention what I claim as new and desire to secure by Letters Patent is:—

1. In a jig saw machine, the combination of a framework supporting a work table and having upper and lower vertically aligned slideways disposed above and below said table, upper and lower sliding members adapted to reciprocate in said slideways, a vertically reciprocating saw blade attached at its ends to said sliding members, a flexible element connected at its opposite ends to said sliding members, said element passing over guide pulleys and moving with the reciprocating blade, and an apron extending over the top of said lower slideway to cover the same and connected to reciprocate with said lower sliding member.

2. In a jig saw machine, the combination of a framework having upper and lower vertically aligned slideways, upper and lower sliding members mounted in said slideways, a vertically reciprocating saw blade attached at its ends to said sliding members, a flexible element connected at its opposite ends to said sliding members, said element passing over guide pulleys and moving with the reciprocating blade, an apron connected at one end to said lower sliding member from which it passes upwardly over a horizontal roller and has its other end connected to said flexible element, and a tension spring connected to said apron.

3. An improved jig saw machine, comprising in combination a framework supporting a horizontal work table, vertically aligned slideways disposed above and below said table and respectively accommodating upper and lower slides, a vertically reciprocating saw blade attached at its ends to said slides, a flexible element connected at its opposite ends to said slides and passing over guide pulleys arranged above and below said table, a tensioning device interposed in said flexible element, and a reciprocating flexible apron covering said lower slideway beneath the table.

4. An improved jig saw machine, comprising in combination a framework supporting a horizontal work table, vertically aligned slideways disposed above and below said table and respectively accommodating upper and lower slides, a vertically reciprocating saw blade attached at its ends to said slides, a flexible element connected at its opposite ends to said slides and passing over guide pulleys arranged above and below said table, a tension spring interposed in said flexible element, and an apron connected at one end to said lower sliding member, said apron passing upwardly beneath said table and over a laterally disposed roller and having its other end connected to said flexible element.

5. In a jig saw machine, the combination of a framework provided with aligned, upper and lower vertical slideways; upper and lower blocks slidably mounted therein; a vertically reciprocating saw blade attached at its ends to said blocks; a flexible element connected at opposite ends to said blocks, said element passing over guide pulleys and moving with the reciprocating blade; an apron attached at its lower end to the lower block to reciprocate therewith and extending upwardly over the top of the lower slideway to cover the same; and means connecting the upper end of said apron with said flexible element.

In testimony whereof I affix my signature.

F. E. GROSE.